United States Patent (10) Patent No.: US 12,484,172 B2
Yu et al. (45) Date of Patent: Nov. 25, 2025

(54) HANGING LUG, SERVER AND SERVER SYSTEM

(71) Applicant: BYD COMPANY LIMITED, Guangdong (CN)

(72) Inventors: Zhitao Yu, Shenzhen (CN); Junjie Huang, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 167 days.

(21) Appl. No.: 18/537,493

(22) Filed: Dec. 12, 2023

(65) Prior Publication Data

US 2024/0130063 A1 Apr. 18, 2024

Related U.S. Application Data

(63) Continuation of application No. PCT/CN2022/110201, filed on Aug. 4, 2022.

(30) Foreign Application Priority Data

Sep. 24, 2021 (CN) .......................... 202111122657.1

(51) Int. Cl.
*H05K 5/02* (2006.01)
*G06F 1/18* (2006.01)

(52) U.S. Cl.
CPC ........... *H05K 5/0247* (2013.01); *G06F 1/183* (2013.01)

(58) Field of Classification Search
CPC ........ H05K 5/0247; H05K 5/023; H05K 5/03; H05K 5/0047; H05K 5/006; H05K 5/0065;

(Continued)

(56) References Cited

U.S. PATENT DOCUMENTS 6,185,106 B1 * 2/2001 Mueller ............... H05K 7/1409
361/801
7,165,984 B1 * 1/2007 Behrens ............... H05K 7/1409
439/157

(Continued)

FOREIGN PATENT DOCUMENTS

CN 204044720 U 12/2014
CN 109254634 A 1/2019

(Continued)

OTHER PUBLICATIONS

English translation of International Search Report from PCT/CN2022/110201 dated Oct. 25, 2022 (3 pages).

*Primary Examiner* — Abhishek M Rathod
(74) *Attorney, Agent, or Firm* — Calfee, Halter & Griswold LLP

(57) ABSTRACT

A hanging lug, a server, and a server system are provided. The hanging lug includes a base, a fastener, a buckle assembly, and an elastic assembly. The fastener is connected to the base. The buckle assembly is rotatably connected to the base, to switch between a first position and a second position. When the buckle assembly is located at the first position, the buckle assembly blocks the fastener. When the buckle assembly is located at the second position, the buckle assembly releases blocking on the fastener. The elastic assembly is connected between the buckle assembly and the base, and in response to a pressing operation acting on the buckle assembly, the elastic assembly drives the buckle assembly to rotate from the first position to the second position, and remains at the second position.

19 Claims, 8 Drawing Sheets

(58) Field of Classification Search
CPC .. H05K 5/0217; H05K 5/0234; H05K 5/0295; H05K 7/1489; H05K 7/1409; H05K 7/1488; H05K 7/1417; H05K 7/1494; H05K 7/1405; H05K 7/1411; G06F 1/183; G06F 1/18; G06F 1/181; G06F 1/186; G06F 1/184; G06F 1/20; G06F 1/16; G06F 1/1656; G06F 1/182; G06F 1/1601; G06F 1/163; G06F 1/1658
See application file for complete search history.

(56) References Cited

U.S. PATENT DOCUMENTS

| | | | |
|---|---|---|---|
| 8,246,129 B2* | 8/2012 | Wang | G06F 1/187 |
| | | | 312/332.1 |
| 10,051,759 B1 | 8/2018 | Chen | |
| 2013/0241377 A1* | 9/2013 | Zhang | G06F 1/181 |
| | | | 403/188 |
| 2016/0345453 A1* | 11/2016 | Zhang | H05K 5/0234 |

FOREIGN PATENT DOCUMENTS

| | | |
|---|---|---|
| CN | 209560430 U | 10/2019 |
| CN | 210639522 U | 5/2020 |
| CN | 210721259 U | 6/2020 |
| CN | 212727674 U | 3/2021 |

\* cited by examiner

HANGING LUG, SERVER AND SERVER SYSTEM

CROSS-REFERENCE TO RELATED APPLICATIONS

The present disclosure is a bypass continuation application of PCT International Application No. PCT/CN2022/110201, filed on Aug. 4, 2022, which claims priority to Chinese Patent Application No. 202111122657.1, filed on Sep. 24, 2021, and entitled "HANGING LUG, SERVER, AND SERVER SYSTEM". The entire contents of the above-referenced applications are incorporated herein by reference.

FIELD

The present disclosure relates to the field of computer device technologies, and more specifically, to a hanging lug, a server, and a server system.

BACKGROUND

To facilitate disassembly and assembly of a server, a hanging lug is arranged on the server, to fix the server to a server cabinet through the hanging lug.

In the related art, the hanging lug includes a buckle and a fastener. Through engagement of the buckle and fixation of the fastener, fixation of the server and the server cabinet is strengthened, and reliability of connection between the server and the server cabinet is improved.

However, in a process of studying the related art, the inventor found that by using a manner of combining the buckle and the fastener, because the buckle blocks the fastener, in a process of removing the server from the server cabinet, first, one hand needs to be used to operate the buckle to expose the fastener when removing the fastener, and then the other hand is used to disassemble the fastener. The whole process is cumbersome, time-consuming, and labor-intensive, and the operation is very inconvenient. This affects operating efficiency and user experience.

SUMMARY

The present disclosure aims to resolve at least one of technical problems in the related art.

A hanging lug according to an embodiment of a first aspect of the present disclosure includes: a base; a fastener, where the fastener is connected to the base; a buckle assembly, where the buckle assembly is rotatably connected to the base, to switch between a first position and a second position, when the buckle assembly is located at the first position, the buckle assembly blocking the fastener, and when the buckle assembly is located at the second position, the buckle assembly releasing blocking on the fastener; and an elastic assembly, where the elastic assembly is connected between the buckle assembly and the base, and in response to a pressing operation acting on the buckle assembly, the elastic assembly driving the buckle assembly to rotate from the first position to the second position, and remaining at the second position.

According to the hanging lug of the embodiment of the present disclosure, by arranging the fastener, the buckle assembly, and the elastic assembly on the base, the buckle assembly is rotatably connected to the base, so that the buckle assembly may block the fastener at the first position, and the buckle assembly may also switch to the second position, to release blocking on the fastener by the buckle assembly. The elastic assembly is connected between the buckle assembly and the base, and may respond to the pressing operation acting on the buckle assembly. Driven by the elastic assembly, the buckle assembly may rotate from the first position to the second position, to release blocking on the fastener by the buckle assembly, and keep the buckle assembly at the second position.

According to some examples of the present disclosure, the elastic assembly includes a first torsion spring; and the buckle assembly includes: a mounting plate, where the mounting plate is rotatably connected to the base through the first torsion spring, the mounting plate includes a pressing part, and the pressing part is movably connected to the mounting plate; and a buckle, where the buckle is connected to the mounting plate, and the buckle is rotatably connected to the base; a mounting groove is provided on the base, the mounting groove is located at a position of the base corresponding to the pressing part, and when the buckle assembly is located at the first position, the pressing part is engaged in the mounting groove, and the mounting plate blocks the fastener; and in response to a pressing operation acting on the pressing part, the first torsion spring drives the mounting plate to rotate from the first position to the second position, and remains at the second position.

According to some examples of the present disclosure, the elastic assembly further includes a first spring; and the pressing part is movably connected to the base through the first spring, in response to the pressing operation acting on the pressing part, the pressing part slides out from the mounting groove, and under an action of the first torsion spring, the mounting plate rotates from the first position to the second position, and remains at the second position.

According to some examples of the present disclosure, the buckle assembly further includes: a connecting rod, where one end of the connecting rod is connected to the mounting plate, and an other end of the connecting rod is connected to the buckle; and rotation of the mounting plate drives the connecting rod to rotate, and rotation of the connecting rod drives the buckle to rotate.

According to some examples of the present disclosure, one end of the connecting rod is rotatably connected to the mounting plate, a sliding groove is provided on an other end of the connecting rod, at least a part of the buckle is engaged in the sliding groove, and the at least a part of the buckle is slidable along the sliding groove.

According to some examples of the present disclosure, the connecting rod includes: a first connecting rod segment, where one end of the first connecting rod segment is rotatably connected to the mounting plate; and a second connecting rod segment, where one end of the second connecting rod segment is connected to an other end of the first connecting rod segment, the second connecting rod segment is perpendicular to the first connecting rod segment, and the sliding groove is formed on the second connecting rod segment.

According to some examples of the present disclosure, the buckle includes: a buckle body, where the buckle body is rotatably connected to the base; a buckle part, where the buckle part is connected to one side of the buckle body away from the mounting plate; and a matching part, where the matching part is connected to the buckle body, a matching column is arranged on the matching part, and the matching column is slidably engaged in the sliding groove.

According to some examples of the present disclosure, the elastic assembly further includes: a second torsion spring, where the buckle is rotatably connected to the base through the second torsion spring; and in response to the pressing operation acting on the pressing part, the second torsion spring drives the buckle to rotate around the base, to drive the mounting plate to rotate from the first position to the second position, and remains at the second position.

According to some examples of the present disclosure, an elastic force of the first torsion spring is greater than an elastic force of the second torsion spring.

According to some examples of the present disclosure, the hanging lug further includes: a first rotating shaft, where the first rotating shaft is arranged on the base, both the mounting plate and the first torsion spring are sleeved outside the first rotating shaft, both the mounting plate and the first torsion spring are rotatable around the first rotating shaft, and the first torsion spring is located between the mounting plate and the first rotating shaft; and a second rotating shaft, the second rotating shaft is arranged on the base, both the buckle and the second torsion spring are sleeved outside the second rotating shaft, both the buckle and the second torsion spring are rotatable around the second rotating shaft, and the second torsion spring is located between the buckle and the second rotating shaft.

According to some examples of the present disclosure, when the buckle assembly is at the second position, a planar direction of the mounting plate is arranged inclined to a vertical direction.

According to some examples of the present disclosure, an angle between the planar direction and the vertical direction of the mounting plate is any value between 0° and 180°.

According to some examples of the present disclosure, the mounting plate further includes: a first mounting part, where the first mounting part is connected to the base; and a second mounting part, where the second mounting part is detachably connected to the first mounting part, the second mounting part is connected to the buckle, and the pressing part is movably connected to the second mounting part.

According to some examples of the present disclosure, the first mounting part and the second mounting part are sequentially arranged in a direction toward the buckle, a matching groove is formed on the second mounting part, the matching groove runs through the second mounting part in a thickness direction of the second mounting part, the matching groove runs through an end surface of one end of the second mounting part away from the first torsion spring, and the pressing part is slidably engaged in the matching groove.

According to some examples of the present disclosure, at least one first engagement member is arranged on the first mounting part, at least one second engagement member is arranged on the second mounting part, and the second engagement member is engaged with the first engagement member to implement detachable connection between the second mounting part and the first mounting part.

A server according to an embodiment of a second aspect of the present disclosure includes: a case; and a hanging lug, where the hanging lug is the hanging lug according to the embodiment of the first aspect of the present disclosure, and the hanging lug is connected to the case.

According to some examples of the present disclosure, the hanging lug includes a functional module; and the server further includes: a baffle, where the baffle is connected to the hanging lug and the case respectively, the baffle, the hanging lug, and the case jointly define an accommodating cavity, and the accommodating cavity is configured to accommodate wiring of the functional module.

According to some examples of the present disclosure, the functional module includes at least one of a USB module and a display graphics array module.

According to some examples of the present disclosure, the baffle is detachably connected to the hanging lug and the case respectively.

A server system according to an embodiment of a third aspect of the present disclosure includes: a server cabinet; and a server, where the server is the server according to the embodiment of the second aspect of the present disclosure, and the server is detachably connected to the server cabinet through the hanging lug of the server.

The additional aspects and advantages of the present disclosure will be provided in the following description, some of which will become apparent from the following description or may be learned from practices of the present disclosure.

BRIEF DESCRIPTION OF THE DRAWINGS

The foregoing and/or additional aspects and advantages of the present disclosure will become apparent and comprehensible from the following descriptions of the embodiments with reference to the accompanying drawings, where.

DETAILED DESCRIPTION

Figure 1:
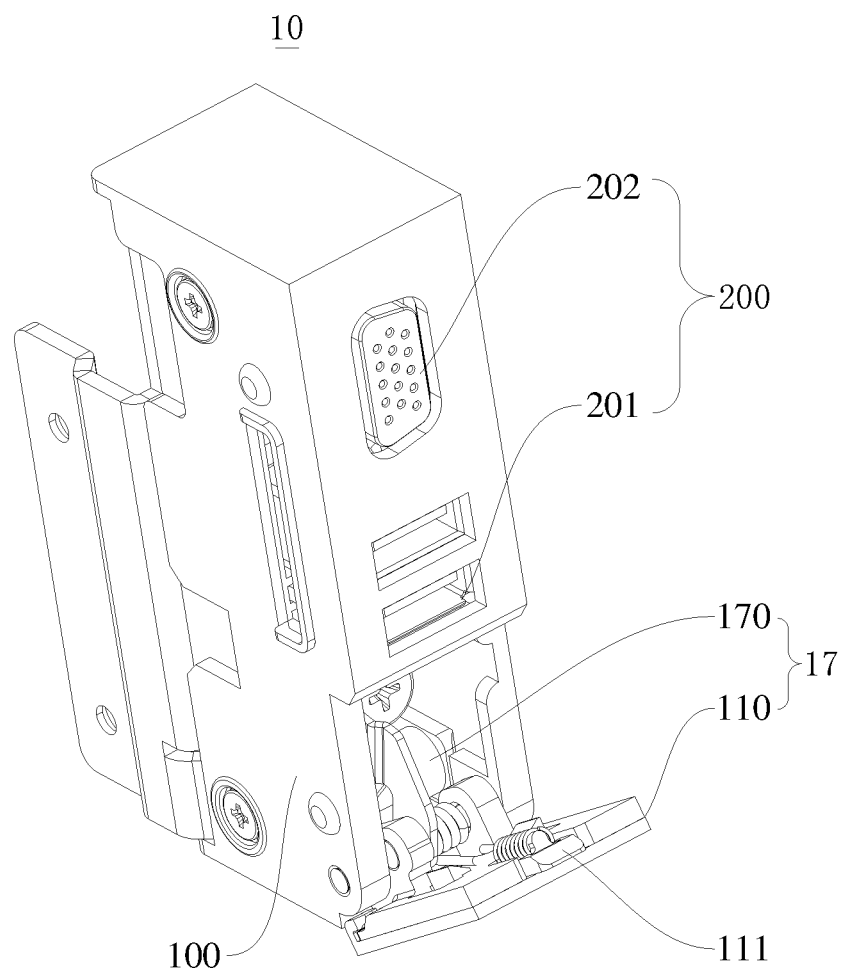
FIG. 1 is a schematic diagram of a structure of a hanging lug according to an embodiment of the present disclosure.

The embodiments of the present disclosure are described below in detail. Examples of the embodiments are shown in the accompanying drawings, and same or similar reference signs in all the accompanying drawings indicate same or similar components or components having same or similar functions. The embodiments described below with reference to the accompanying drawings are exemplary, and are merely intended to explain the present disclosure and cannot be construed as a limitation to the present disclosure.

In the description of the present disclosure, it should be understood that orientation or position relationships indicated by the terms such as "center", "above", "below", "front", "back", "left", "right", "vertical", "horizontal" "top", "bottom", "inside", and "outside" are based on orientation or position relationships shown in the accompanying drawings, and are used only for ease and brevity of illustration and description, rather than indicating or implying that the mentioned apparatus or component needs to have a particular orientation or needs to be constructed and operated in a particular orientation. Therefore, such terms should not be construed as limiting of the present disclosure.

It should be noted that the terms "first" and "second" are used merely for the purpose of description, and shall not be construed as indicating or implying relative importance or implying a quantity of indicated technical features. Therefore, a feature limited by "first" or "second" may explicitly or implicitly include one or more features. Further, in the description of the present disclosure, unless stated otherwise, the meaning of "a plurality of" is two or more than two.

As shown in FIG. 1 to FIG. 4, a hanging lug 10 according to an embodiment of the present disclosure may include a base 100, a fastener 180, a buckle assembly 17, and an elastic assembly 190.

Specifically, the fastener 180 is connected to the base 100. The buckle assembly 17 is rotatably connected to the base 100, to switch between a first position and a second position.

When the buckle assembly 17 is located at the first position, the buckle assembly 17 blocks the fastener 180, and when the buckle assembly 17 is located at the second position, the buckle assembly 17 releases blocking on the fastener 180.

The elastic assembly 190 is connected between the buckle assembly 17 and the base 100. In response to a pressing operation acting on the buckle assembly 17, the elastic assembly 190 drives the buckle assembly 17 to rotate from the first position to the second position, and remains at the second position.

According to the hanging lug 10 of the embodiment of the present disclosure, by arranging the fastener 180, the buckle assembly 17, and the elastic assembly 190 on the base 100, the buckle assembly 17 is rotatably connected to the base 100, so that the buckle assembly 17 may block the fastener 180 at the first position, and the buckle assembly 17 may also switch to the second position, to release blocking on the fastener 180 by the buckle assembly 17. The elastic assembly 190 is connected between the buckle assembly 17 and the base 100, and the elastic assembly 190 may respond to a pressing operation acting on the buckle assembly 17. Driven by the elastic assembly 190, the buckle assembly 17 may rotate from the first position to the second position, to release blocking on the fastener 180 by the buckle assembly 17, and keep the buckle assembly 17 at the second position.

Therefore, when the hanging lug 10 is applied to a server 400, in a process of disassembling the server 400 from a server cabinet 501, only one hand needs to be used to perform a pressing operation on the buckle assembly 17 of the hanging lug 10 first, so that the buckle assembly 17 rotates from the first position to the second position, and remains at the second position at which blocking on the fastener 180 is released and the fastener 180 is exposed. Then, when the buckle assembly 17 remains releasing blocking on the fastener 180, the fastener 180 may be disassembled with one hand, without the need for two hands to simultaneously cooperate with each other. The operation is simple and labor-saving, which improves operating efficiency of an operator, and enhances user experience.

In some embodiments of the present disclosure, in a normal state, for example, when the server 400 and the server cabinet 501 are in an operating state, the hanging lug 10 may implement stable connection between the server 400 and the server cabinet 501 through the buckle assembly 17. In a special state, for example, in a process of transporting the server 400 or testing the server 400, based on implementing stable connection between the server 400 and the server cabinet 501 through the buckle assembly 17, the connection between the server 400 and the server cabinet 501 is further strengthened by using the fastener 180, thereby improving stability and reliability of the connection between the server 400 and the server cabinet 501, and avoiding damage caused by the server 400 detaching from the server cabinet 501 during transportation or testing.

In some embodiments of the present disclosure, the base 100 may provide bearing and support for the fastener 180, the buckle assembly 17, and the elastic assembly 190 of the hanging lug 10, so that the fastener 180, the buckle assembly 17, and the elastic assembly 190 may be mounted on the base 100. When the hanging lug 10 is applied to the server 400, in an application scenario in which the server 400 is mounted in the server cabinet 501, connection between the server 400 and the server cabinet 501 may be implemented through the buckle assembly 17 being engaged on the server cabinet 501. The fastener 180 may fasten the connection between the server 400 and the server cabinet 501, further improving stability and reliability of the connection. When the buckle assembly 17 is need to release blocking on the fastener 180, the elastic assembly 190 provides an elastic force for the buckle assembly 17, so that the buckle assembly 17 may release blocking on the fastener 180 under the driving of the elastic assembly 190, and keep the buckle assembly 17 at a position at which blocking on the fastener 180 is released, to facilitate removing of the fastener 180.

In some optional embodiments of the present disclosure, the fastener 180 may include a bolt, a stud, a screw, a nut, a rivet, a self-tapping screw, a wood screw, and the like. A specific type of the fastener 180 is not limited in the present disclosure.

According to some embodiments of the present disclosure, refer to FIG. 1 to FIG. 5, the elastic assembly 190 includes a first torsion spring 141. The buckle assembly 17 includes a mounting plate 110 and a buckle 170. The mounting plate 110 includes a pressing part 111, and the pressing part 111 is movably connected to the mounting plate 110. The mounting plate 110 is rotatably connected to the base 100 through the first torsion spring 141. The buckle 170 is connected to the mounting plate 110, and the buckle 170 is rotatably connected to the base 100. A mounting groove 101 is provided on the base 100, and the mounting groove 101 is located at a position of the base 100 corresponding to the pressing part 111. When the buckle assembly 17 is located at the first position, the pressing part 111 is engaged in the mounting groove 101, and the mounting plate 110 blocks the fastener 180. In response to a pressing operation acting on the pressing part 111, the first torsion spring 141 drives the mounting plate 110 to rotate from the first position to the second position, and remains at the second position.

Therefore, by providing the mounting groove 101 on the base 100 and embedding the pressing part 111 in the mounting groove 101, the connection between the pressing part 111 and the base 100 may be implemented. When the mounting plate 110 is located at the first position, the mounting plate 110 blocks the fastener 180. When a user performs the pressing operation on the pressing part 111, the pressing part 111 slides out from the mounting groove 101. Under an action of an elastic force of the first torsion spring 141, the first torsion spring 141 drives the mounting plate 110 to move, and the mounting plate 110 rotates from the first position to the second position, to release blocking on the fastener 180 by the mounting plate 110, and keep the mounting plate 110 at the second position at which blocking on the fastener 180 is released. In a process in which the mounting plate 110 rotates from the first position to the second position, the mounting plate 110 drives the buckle 170 to rotate.

Optionally, refer to FIG. 1 to FIG. 5, the elastic assembly 190 further includes a first spring 131. The pressing part 111 is movably connected to the base 100 through the first spring 131, in response to the pressing operation acting on the pressing part 111, the pressing part 111 slides out from the mounting groove 101, and under an action of the first torsion spring 141, the mounting plate 110 rotates from the first position to the second position, and remains at the second position.

When the mounting plate 110 is at the second position, the user may push the mounting plate 110 to rotate in a direction toward the mounting groove 101 of the base 100. Under the action of the first spring 131, the pressing part 111 pops up toward the direction of the mounting groove 101, so that the pressing part 111 is firmly embedded in the mounting groove 101 of the base 100. When the mounting plate 110 is at the first position, in response to the pressing operation acting on the pressing part 111, the pressing part 111 slides out from the mounting groove 101 under an action of an elastic force of the first spring 131, and under an action of the first torsion spring 141, the mounting plate 110 rotates from the first position to the second position, to release blocking on the fastener 180 by the mounting plate 110, and remains at the second position.

In some further embodiments of the present disclosure, as shown in FIG. 2 to FIG. 4 and FIG. 9, the buckle assembly 17 further includes a connecting rod 160. One end of the connecting rod 160 is connected to the mounting plate 110, and an other end of the connecting rod 160 is connected to the buckle 170. Rotation of the mounting plate 110 drives the connecting rod 160 to rotate, and rotation of the connecting rod 160 drives the buckle 170 to rotate.

When the hanging lug 10 is applied to the server 400 and the server 400 is connected to the server cabinet 501 through the hanging lug 10, the buckle 170 is engaged with the server cabinet 501. When the mounting plate 110 rotates from the first position to the second position, the mounting plate 110 drives the connecting rod 160 to rotate, and the connecting rod 160 drives the buckle 170 to rotate, so that connection between the buckle 170 and the server cabinet 501 is released, thereby facilitating disassembly of the server 400 from the server cabinet 501.

Optionally, refer to FIG. 2 to FIG. 9, one end of the connecting rod 160 is rotatably connected to the mounting plate 110, a sliding groove 1621 is provided on an other end of the connecting rod 160, at least a part of the buckle 170 is engaged in the sliding groove 1621, and the at least a part of the buckle 170 is slidable along the sliding groove 1621. Therefore, by embedding at least a part of the buckle 170 in the sliding groove 1621, the buckle 170 may be slidably connected to the connecting rod 160. In a process in which the mounting plate 110 rotates from the first position to the second position, the mounting plate 110 drives the connecting rod 160 to rotate, the buckle 170 may slide along the sliding groove 1621 from one end of the sliding groove 1621 to an other end of the sliding groove 1621, and remain at a position of an other end of the sliding groove 1621, thereby further facilitating the connection between the connecting rod 160 and the buckle 170, and causing the buckle 170 to be slidably movable with the connecting rod 160.

Figure 2:
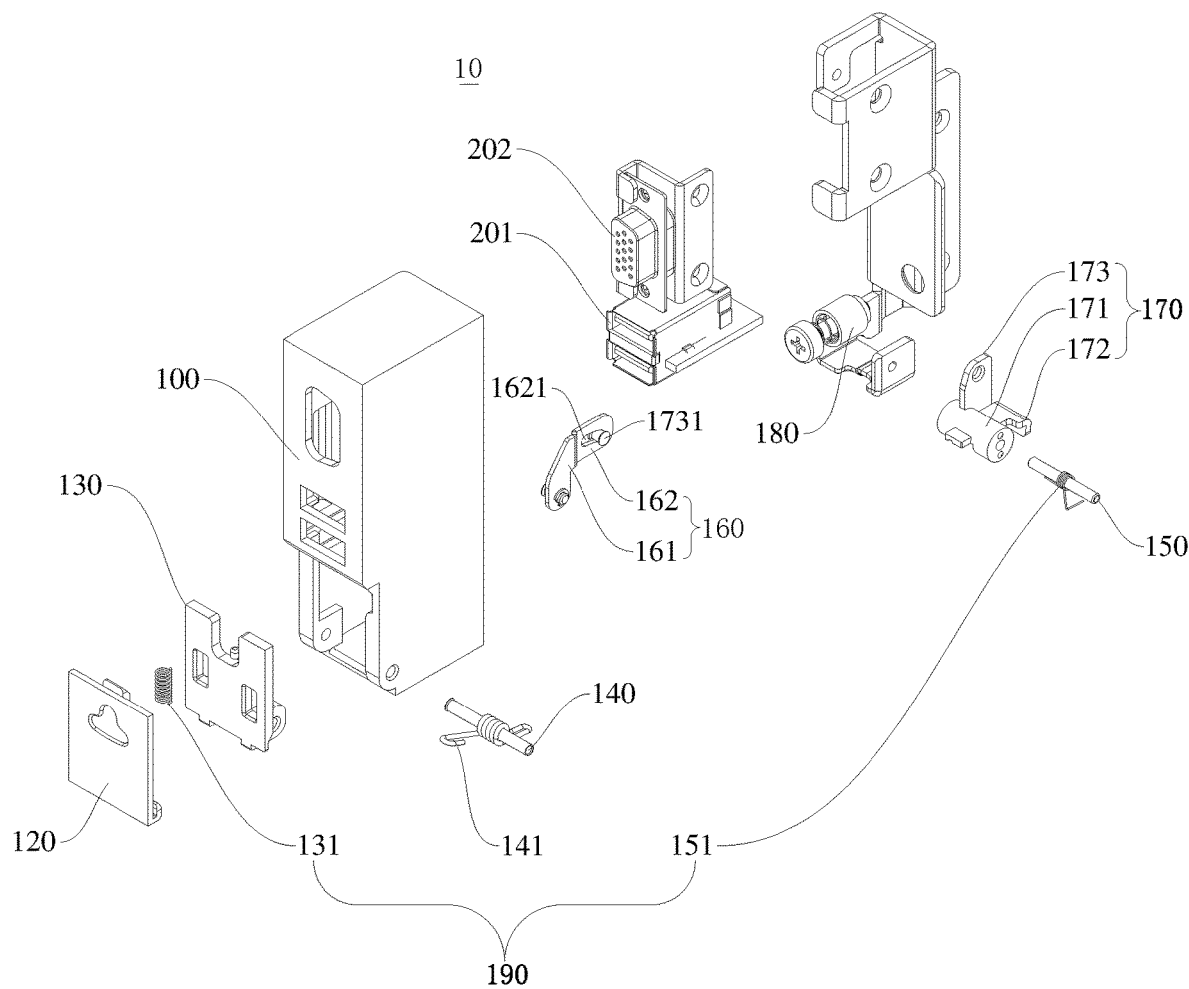
FIG. 2 is an exploded view of a hanging lug according to an embodiment of the present disclosure.
Figure 9:
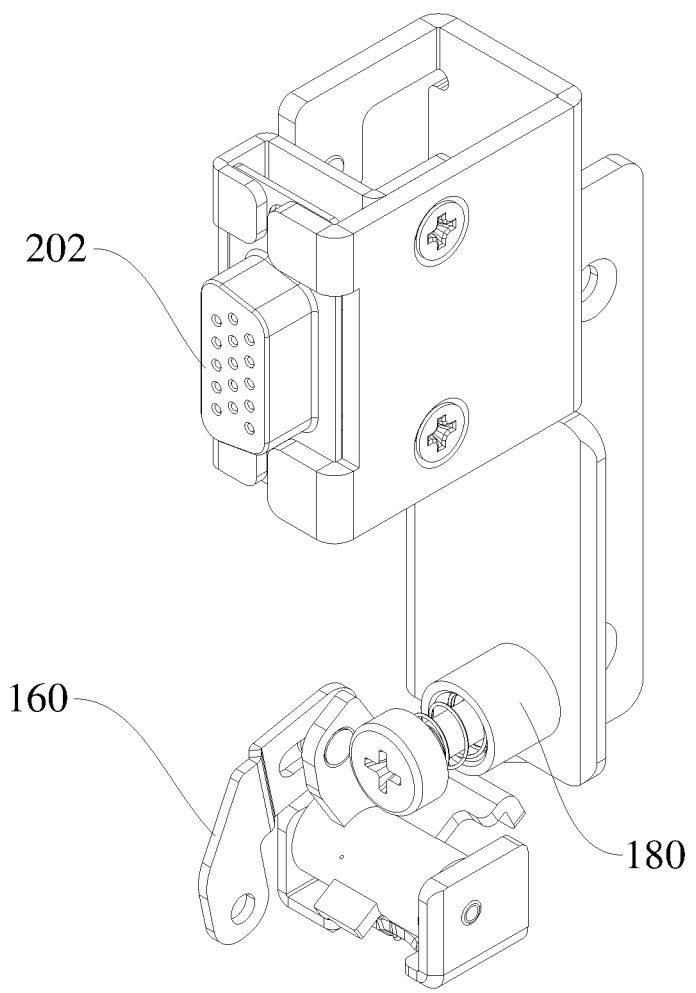
FIG. 9 is a schematic diagram of a structure of an assembly 2 of a hanging lug according to an embodiment of the present disclosure.

In some specific embodiments of the present disclosure, as shown in FIG. 2 and FIG. 9, the connecting rod 160 includes a first connecting rod segment 161 and a second connecting rod segment 162, where one end of the first connecting rod segment 161 is rotatably connected to the mounting plate 110. One end of the second connecting rod segment 162 is connected to an other end of the first connecting rod segment 161, the second connecting rod segment 162 is perpendicular to the first connecting rod segment 161, and the sliding groove 1621 is formed on the second connecting rod segment 162. Therefore, by arranging the first connecting rod segment 161 and the second connecting rod segment 162, when the mounting plate 110 switches between the first position and the second position, smoothness of the movement of the mounting plate 110 and the buckle 170 may be effectively ensured. Moreover, the connecting rod 160 has a compact structure, which may reduce space occupied by the connecting rod 160 and thereby reduce a volume of the hanging lug 10. In addition, the connecting rod 160 has a simple structure.

Figure 3:
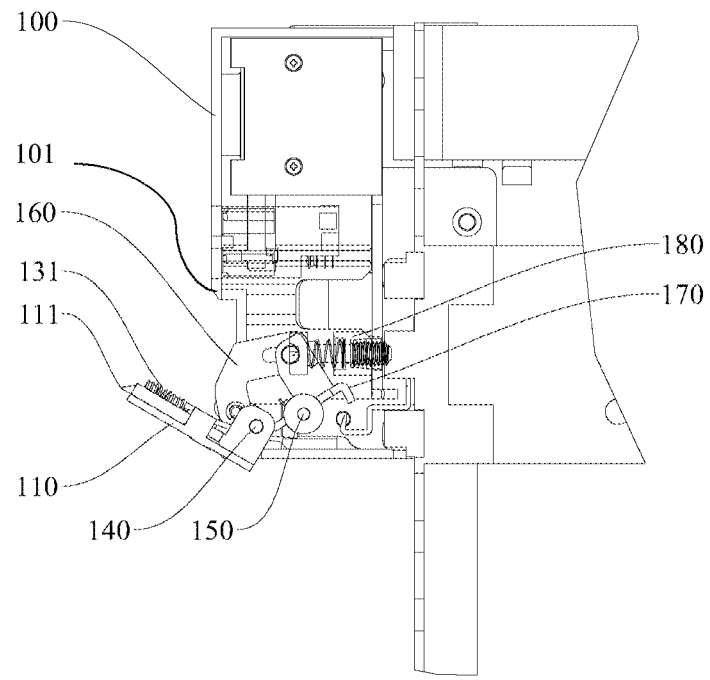
FIG. 3 is a partial cross-sectional view of a hanging lug according to an embodiment of the present disclosure, where a buckle assembly is located at a second position.
Figure 4:
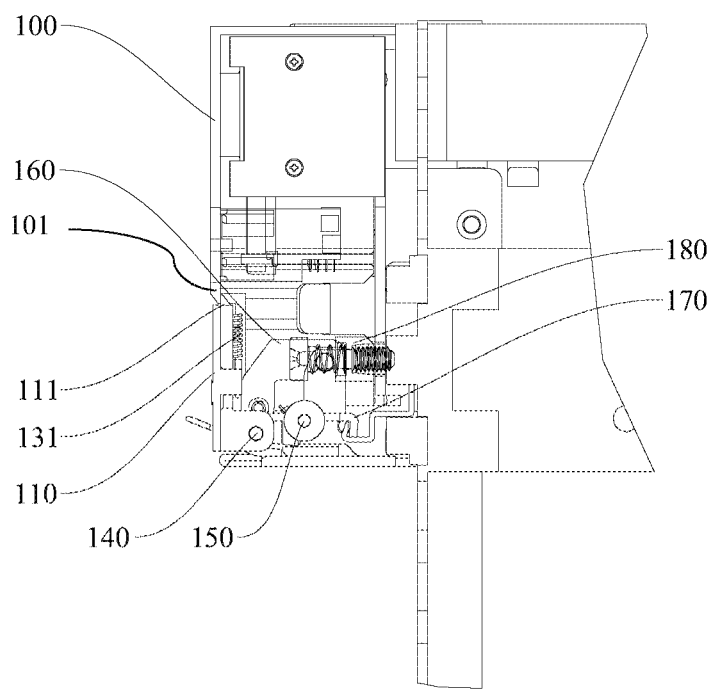
FIG. 4 is another partial cross-sectional view of a hanging lug according to an embodiment of the present disclosure, where a buckle assembly is located at a second position.

In some specific embodiments of the present disclosure, refer to FIG. 2 and FIG. 9 and with reference to FIG. 3 and FIG. 4, the buckle 170 includes a buckle body 171, a buckle part 172, and a matching part 173. The buckle body 171 is rotatably connected to the base 100, and the buckle part 172 is connected to one side of the buckle body 171 away from the mounting plate 110. For example, one end of the buckle part 172 is connected to the buckle body 171, and an other end of the buckle part 172 extends in a direction away from the mounting plate 110. There is a hook on an other end of the buckle part 172, to be connected to the server cabinet 501. The matching part 173 is connected to the buckle body 171, a matching column 1731 is arranged on the matching part 173, and the matching column 1731 is slidably engaged in the sliding groove 1621. The matching part 173 may be located between the connecting rod 160 and the fastener 180, to cause a structure of the entire hanging lug 10 to be more compact.

In some embodiments of the present disclosure, as shown in FIG. 2, the elastic assembly 190 further includes a second torsion spring 151. The buckle 170 is rotatably connected to the base 100 through the second torsion spring 151, and in response to the pressing operation acting on the pressing part 111, the second torsion spring 151 drives the buckle 170 to rotate around the base 100, to drive the mounting plate 110 to rotate from the first position to the second position, and remains at the second position.

In response to the pressing operation acting on the pressing part 111, under an action of an elastic force of the second torsion spring 151, the second torsion spring 151 may drive the buckle 170 to rotate around the base 100, to drive the mounting plate 110 to rotate from the first position to the second position, and remain at the second position. Therefore, by arranging the second torsion spring 151, the buckle 170 may rotate around the base 100 more easily under the action of the elastic force of the second torsion spring 151.

Optionally, an elastic force of the first torsion spring 141 is greater than an elastic force of the second torsion spring 151. In this way, in response to the pressing operation acting on the buckle assembly 17, the first torsion spring 141 may drive the mounting plate 110 to rotate. The second torsion spring 151 whose elastic force is less than the elastic force of the first torsion spring 141 may drive the buckle 170 to rotate, so that the mounting plate 110 may rotate from the first position to the second position more smoothly, remove blocking on the fastener 180, and the mounting plate 110 remains at the second position.

Figure 8:
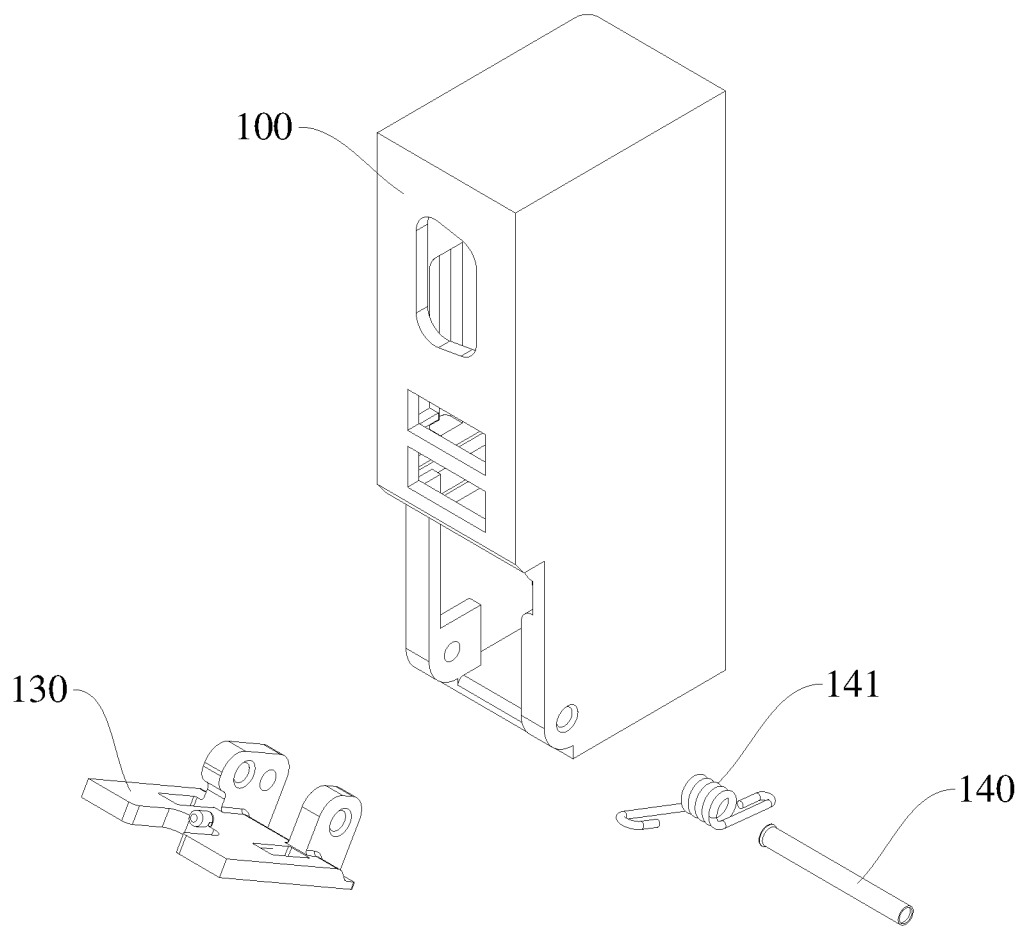
FIG. 8 is a schematic diagram of a structure of an assembly 1 of a hanging lug according to an embodiment of the present disclosure.

Optionally, refer to FIG. 2 and FIG. 8, the hanging lug 10 further includes a first rotating shaft 140 and a second rotating shaft 150. Both the first rotating shaft 140 and the second rotating shaft 150 are arranged on the base 100. Both the mounting plate 110 and the first torsion spring 141 are sleeved outside the first rotating shaft 140, and both the mounting plate 110 and the first torsion spring 141 are rotatable around the first rotating shaft 140. The first torsion spring 141 is located between the mounting plate 110 and the first rotating shaft 140, implements rotatable connection between the mounting plate 110 and the base 100, and provides an elastic force drive for the mounting plate 110. Both the buckle 170 and the second torsion spring 151 are sleeved outside the second rotating shaft 150, and both the buckle 170 and the second torsion spring 151 are rotatable around the second rotating shaft 150. The second torsion spring 151 is located between the buckle 170 and the second rotating shaft 150, implements rotatable connection between the buckle 170 and the base 100, and provides an elastic force drive for the buckle 170.

Optionally, as shown in FIG. 4, when the buckle assembly 17 is at the second position, a planar direction of the mounting plate 110 is arranged inclined to a vertical direction. Because the planar direction of the mounting plate 110 is inclined to the vertical direction, a plane of the mounting plate 110 forms an inclination angle with the vertical direction, and the inclination angle may be set as a preset angle. The preset angle may include any value from 0 to 180°. Optionally, the inclination angle may be 60°, to facilitate assembly or disassembly of the fastener 180 at the second position.

Figure 5:
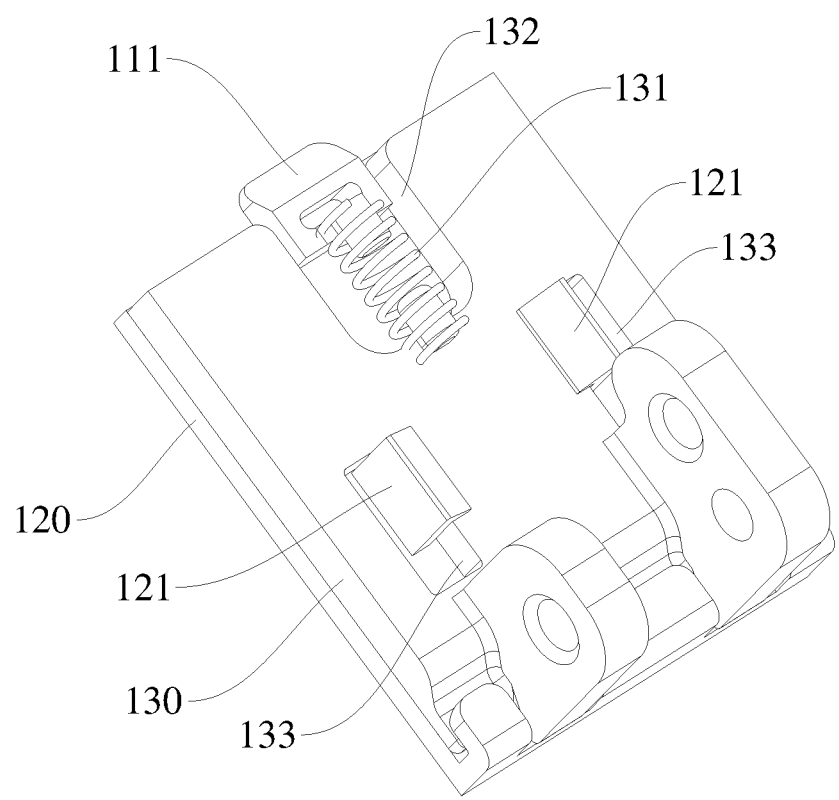
FIG. 5 is a schematic diagram of a mounting plate and a first spring of a hanging lug according to an embodiment of the present disclosure.

In some embodiments of the present disclosure, referring to FIG. 2 and FIG. 5, the mounting plate assembly 110 further includes a first mounting part 120 and a second mounting part 130. The first mounting part 120 is connected to the base 100, the second mounting part 130 is connected to the buckle 170, and the first mounting part 120 is detachably connected to the second mounting part 130. For example, in examples in FIG. 2 and FIG. 5, the first mounting part 120 and the second mounting part 130 are sequentially arranged in a direction toward the buckle 170. In this case, the first mounting part 120 and the second mounting part 130 are arranged in a thickness direction of the first mounting part 120. A matching groove 132 is formed on the second mounting part 130, the matching groove 132 runs through the second mounting part 130 in a thickness direction of the second mounting part 130, the matching groove 132 runs through an end surface of one end of the second mounting part 130 away from the first torsion spring 141, and the pressing part 111 is slidably engaged in the matching groove 132. Therefore, a structure of the first mounting part 120 and a structure of the second mounting part 130 are simple and easy to process, so that the cost may be reduced.

Optionally, as shown in FIG. 5, at least one first engagement member 121 is arranged on the first mounting part 120, at least one second engagement member 133 is arranged on the second mounting part 130, the second engagement member 133 corresponds to the first engagement member 121, and the first engagement member 121 is engaged with the second engagement member 133, to implement detachable connection between the first mounting part 120 and the second mounting part 130.

During actual application, patterns such as a brand logo may be arranged on the second mounting part 130. The second mounting part 130 is detachably connected to the first mounting part 120, so that the second mounting part 130 may be disassembled according to an actual need of the user without affecting other assemblies of the hanging lug 10, and the second mounting part 130 is replaced with a second mounting part 130 with another brand logo or without a brand logo pattern, thereby providing convenience to the user.

Optionally, the engagement member may include a hook, a card, a card plate, and the like. A specific type of the engagement member is not limited in the present disclosure.

In summary, the hanging lug 10 of the embodiment of the present disclosure includes at least the following advantages. By using the hanging lug 10 of the embodiment of the present disclosure, the fastener 180, the buckle assembly 17, and the elastic assembly 190 are arranged on the base 100 of the hanging lug 10, the buckle assembly 17 is rotatably connected to the base 100, so that the buckle assembly 17 may block the fastener 180 at the first position, and the buckle assembly 17 may also switch to the second position, to release blocking on the fastener 180 by the buckle assembly 17. The elastic assembly 190 is connected between the buckle assembly 17 and the base 100, and may respond to a pressing operation acting on the buckle assembly 17. Driven by the elastic assembly 190, the buckle assembly 17 may rotate from the first position to the second position, to release blocking on the fastener 180 by the buckle assembly 17, and keep the buckle assembly 17 at the second position. Therefore, in a process of disassembling a server 400 from a server cabinet 501, only one hand needs to be used to perform the pressing operation on the buckle assembly 17 of the hanging lug 10 first, so that the buckle assembly 17 rotates from the first position to the second position, and remains at the second position at which blocking on the fastener 180 is released and the fastener 180 is exposed, so that when the buckle assembly 17 remains releasing blocking on the fastener 180, the fastener 180 may be disassembled with one hand, without the need for two hands to simultaneously cooperate with each other. The operation is simple and labor-saving, which improves operating efficiency of an operator, and enhances user experience.

Figure 6:
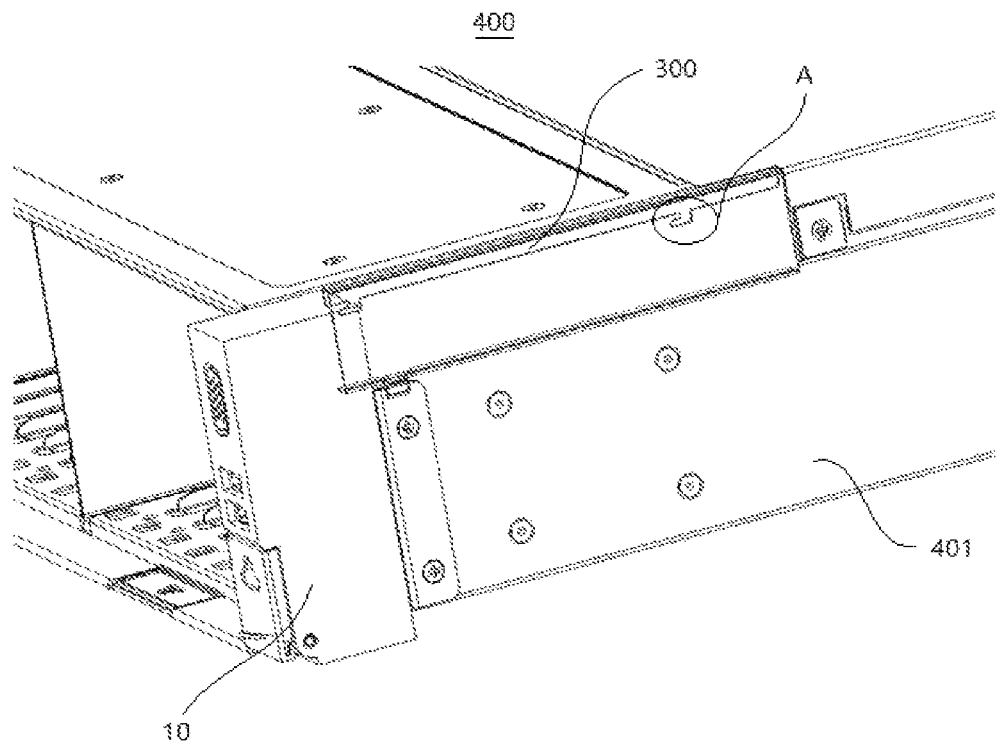
FIG. 6 is a schematic diagram of a partial structure of connection between a hanging lug and a server according to an embodiment of the present disclosure.
Figure 7:
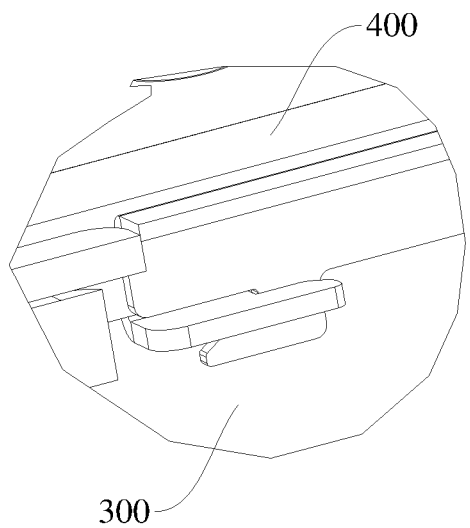
FIG. 7 is an enlarged view of a part A circled in FIG. 6.
Figure 10:
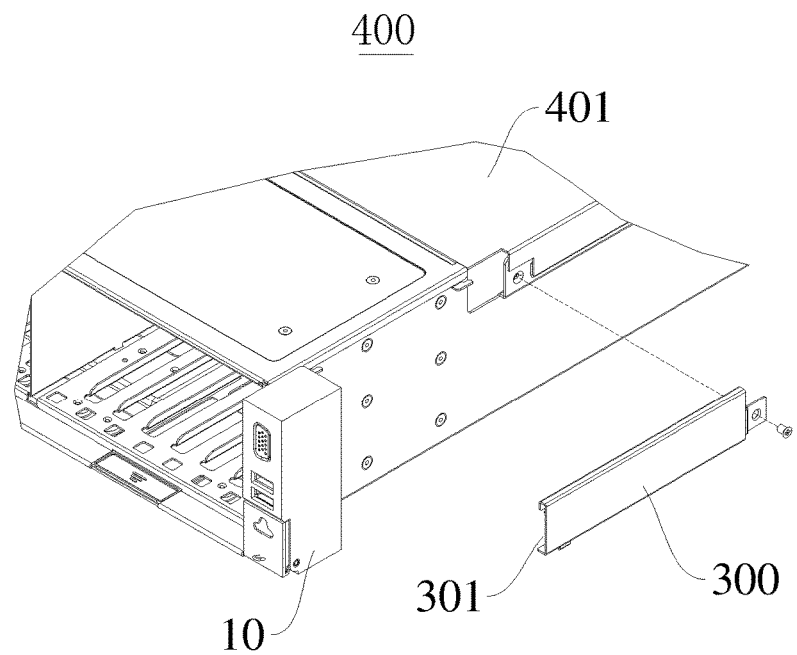
FIG. 10 is an exploded view of a server according to an embodiment of the present disclosure.

As shown in FIG. 6, FIG. 7, and FIG. 10, the present disclosure further discloses a server 400, which includes a case 401 and a hanging lug 10. The hanging lug 10 is connected to the case 401. The hanging lug 10 is the hanging lug 10 according to an embodiment of the present disclosure.

By connecting the hanging lug 10 to the case 401 of the server 400, the server 400 may be connected to the server cabinet 501 through the hanging lug 10. In a process of disassembling the server 400 from the server cabinet 501, only one hand needs to be used to perform the pressing operation on the buckle assembly 17 of the hanging lug 10 first, so that the buckle assembly 17 rotates from the first position to the second position, and remains at the second position at which blocking on the fastener 180 is released and the fastener 180 is exposed, so that when the buckle assembly 17 remains releasing blocking on the fastener 180, the fastener 180 may be disassembled with one hand, thereby facilitating assembly or disassembly of the server 400 on or from the server cabinet 501 through the hanging lug 10.

Optionally, the hanging lug 10 includes a functional module 200, and the functional module 200 includes at least one of a universal serial bus (USB) module and a display graphics array module 202. The server 400 further includes a baffle 300, where the baffle 300 is connected to the hanging lug 10 and the case 401 respectively, the baffle 300, the hanging lug 10, and the case 401 jointly define an accommodating cavity 301, and the accommodating cavity 301 is configured to accommodate wiring of the functional module 200.

During actual application, the functional module 200 usually includes at least one of a USB module 201 and a display graphics array module 202, where the USB module 201 may include a printed circuit board (PCB). An example in which the functional module 200 includes a USB module 201 and a display graphics array module 202 is used, to describe the mounting steps.

Step 1: A mounting plate 110 is mounted to a base 100 of a hanging lug 10.

First, a first torsion spring 141 is sleeved on a first rotating shaft 140, then a first mounting part 120 of the mounting plate 110 is assembled on the first rotating shaft 140, and then the mounting plate 110 is mounted on the base 100 through the first rotating shaft 140, to obtain an assembly 1. Under an action of an elastic force of the first torsion spring 141, an inclination angle between a plane and a vertical direction of the first mounting part 120 of the assembled mounting plate 110 opens at a preset angle in an initial state. The preset angle may include any value from 0 to 180°. Optionally, the inclination angle may be set to 60°.

Step 2: A buckle 170, a connecting rod 160, a display graphics array module 202, and a fastener 180 are assembled.

The hanging lug 10 may further include a support frame, and the display graphics array module 202 is fixed at a corresponding position of the support frame through a connecting member. Next, at least a part of the buckle 170 is slidably connected to a sliding groove 1621 of the connecting rod 160. In addition, a second torsion spring 151 is sleeved on a second rotating shaft 150, and the buckle 170 is sleeved on a second torsion spring 151, so that the buckle 170 is rotatably connected to the second rotating shaft 150. Then, the fastener 180 is connected to the base 100, to obtain an assembly 2.

Step 3: A USB module 201, an assembly 1, and an assembly 2 are assembled.

The base 100 of the hanging lug 10 may include an engagement groove of the USB module 201, and the USB module 201 is assembled with the base 100 through the engagement groove of the USB module 201. Then, the assembly 2 is nested in the assembly 1, and one end of the connecting rod 160 is connected to the first mounting part 120 of the mounting plate 110. After the assembly is completed, the assembly 2 and the assembly 1 are locked, and the first mounting part 120 of the mounting plate 110, the connecting rod 160, and the buckle 170 are connected.

Step 4: A second mounting part 130 is assembled.

The second mounting part 130 is engaged on the first mounting part 120 through a first engagement member 121 and a second engagement member 133, to implement detachable connection between the first mounting part 120 and the second mounting part 130. Then a first spring 131 is mounted at a position of a pressing part 111, thereby obtaining the hanging lug 10.

Step 5: The hanging lug 10 is assembled on a case 401 of a server 400.

A hanging lug mounting part may be arranged on the case 401 of the server 400, and the hanging lug 10 is mounted and fixed on the case 401 of the server 400 through the hanging lug mounting part.

Optionally, the hanging lug mounting part may include a single mounting component or a combination of a plurality of mounting components such as a flange, a card, a hook, a bolt, a screw, a stud, a rivet, and the like. A specific type of the hanging lug mounting part is not limited in the present disclosure.

Step 6: A wiring stopping sheet is assembled.

After completing assembly of step 5, wiring of the functional module 200 such as the display graphics array module 202 and the USB module 201 is exposed outside the server 400. A wiring gap is provided on the case 401 of the server 400. The wiring is placed in the server 400 along the wiring gap, and then blocking on a baffle 300 is exposed outside wiring of the server 400.

A baffle mounting part may be arranged on the baffle 300, and the baffle mounting part is correspondingly arranged on the hanging lug 10 and the case 401 of the server 400 respectively. Through connection between the baffle mounting part and a baffle mounting component, the baffle 300 is connected and fixed to the hanging lug 10 and the case 401 of the server 400 respectively.

It should be noted that the foregoing is just an example of assembly steps that may complete the embodiment of the present disclosure. A person skilled in the art should appreciate that the embodiments of the present disclosure are not limited to the order of the described steps, because according to the embodiments of the present disclosure, some steps may be performed in other orders or simultaneously. In addition, a person skilled in the art should understand that the embodiments described in the present specification are exemplary embodiments and that actions involved in these embodiments are not necessarily required by the embodiments of the present disclosure.

Optionally, the baffle 300 is detachably connected to the hanging lug 10 and the case 401 respectively. Such arrangement may facilitate assembly of the wiring of the baffle 300 and improve convenience of operation by technicians.

Specifically, a baffle mounting part is arranged on the baffle 300, and the baffle mounting part is arranged on the hanging lug 10 and the case 401 of the server 400 respectively. Through connection between the baffle mounting part and a baffle mounting component, the baffle 300 is detachably connected to the hanging lug 10 and the case 401 of the server 400 respectively.

The baffle mounting part may include a single mounting component or a combination of a plurality of mounting components such as, a card, a hook, a bolt, a screw, a stud, a rivet, and the like. A specific type of the baffle mounting part is not limited in the present disclosure.

In summary, the server 400 according to the embodiment of the present disclosure includes at least the following advantages. The buckle assembly 17, the fastener 180, and the elastic assembly 190 are arranged on the base 100 of the hanging lug 10 of the server 400, and the buckle assembly 17 is rotatably connected to the base 100. The elastic assembly 190 is connected between the buckle assembly 17 and the base 100, and may respond to a pressing operation acting on the buckle assembly 17. Driven by the elastic assembly 190, the buckle assembly 17 rotates from the first position to the second position, to release blocking on the fastener 180 by the buckle assembly 17, and keep the buckle assembly 17 at the second position. Therefore, in a process of disassembling a server 400 from a server cabinet 501, only one hand needs to be used to perform the pressing operation on the buckle assembly 17 of the hanging lug 10 first, so that the buckle assembly 17 rotates from the first position to the second position, and remains at the second position at which blocking on the fastener 180 is released and the fastener 180 is exposed, so that when the buckle assembly 17 remains releasing blocking on the fastener 180, the fastener 180 may be disassembled with one hand, without the need for two hands to simultaneously cooperate with each other. The operation is simple and labor-saving, which improves operating efficiency of an operator, and enhances user experience. In addition, a wiring baffle provides larger space for wiring, making it easier for a person skilled in the art to perform a wiring operation.

Figure 11:
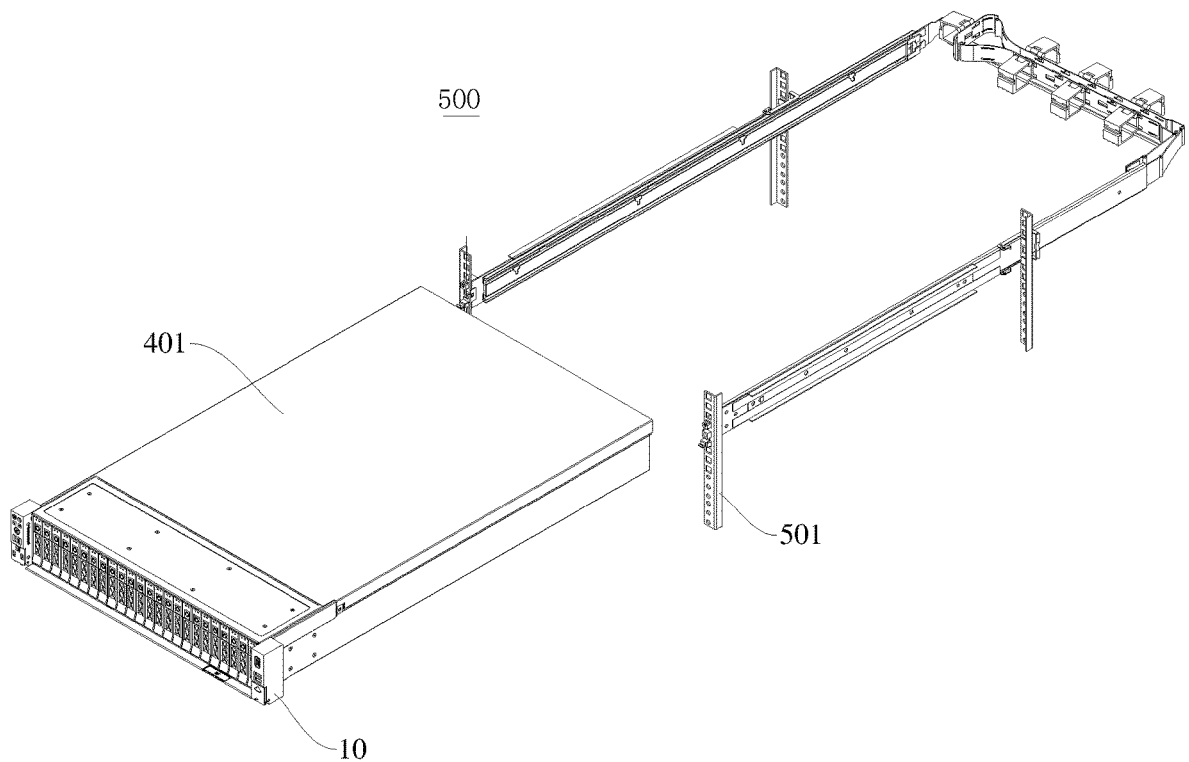
FIG. 11 is an exploded view of a server system according to an embodiment of the present disclosure.

As shown in FIG. 11, a server system 500 according to the embodiment of the present disclosure includes a server cabinet 501 and a server 400. The server 400 is the server 400 according to the embodiment of the present disclosure, and the server 400 is detachably connected to the server cabinet 501 through the hanging lug 10 of the server 400.

In the server system 500 according to the embodiment of the present disclosure, by using the server 400, overall performance of the server system 500 may be improved.

At last, it should be noted that the relational terms herein such as first and second are used only to differentiate an entity or operation from another entity or operation, and do not require or imply any actual relationship or sequence between these entities or operations. Moreover, the terms "include," "comprise," and any variation thereof are intended to cover a non-exclusive inclusion. Therefore, in the context of a process, a method, an object, or a device that includes a series of elements, the process, method, object, or terminal device not only includes such elements, but also includes other elements not specified expressly, or may include inherent elements of the process, method, object, or terminal device. Unless otherwise specified, an element limited by "include one . . . " does not exclude other same elements existing in the process, the method, the article, or the terminal device that includes the element.

A hanging lug 10, a server 400, and a server system 500 provided in the present disclosure are described in detail above. The principle and implementations of the present disclosure are described in this specification by using specific examples. The descriptions of the foregoing embodiments are merely used for helping understand the method and core ideas of the present disclosure. Meanwhile, a person of ordinary skill in the art may make modifications to the specific implementations and application scopes according to the ideas of the present disclosure. In conclusion, the content of the specification should not be construed as a limitation to the present disclosure.

In the description of this specification, the description of the reference terms such as "an embodiment", "some embodiments", "exemplary embodiments", "example", "specific example", or "some examples" means that the specific features, structures, materials or characteristics described with reference to the embodiment or example are included in at least one embodiment or example of the present disclosure. In this specification, schematic descriptions of the foregoing terms do not necessarily point at a same embodiment or example. In addition, the described specific features, structures, materials, or characteristics may be combined in a proper manner in any one or more of the embodiments or examples.

Although the embodiments of the present disclosure have been shown and described, a person of ordinary skill in the art may understand that: various changes, modifications, replacements, and variations may be made to the embodiments without departing from the principles and spirit of the present disclosure, and the scope of the present disclosure is as defined by the appended claims and their equivalents.

What is claimed is:

1. A hanging lug, comprising:
a base;
a fastener, the fastener being connected to the base;
a buckle assembly, the buckle assembly being rotatably connected to the base, to switch between a first position and a second position, when the buckle assembly is located at the first position, the buckle assembly blocking the fastener, and when the buckle assembly is located at the second position, the buckle assembly releasing blocking on the fastener; and
an elastic assembly, the elastic assembly being connected between the buckle assembly and the base, and in response to a pressing operation acting on the buckle assembly, the elastic assembly driving the buckle assembly to rotate from the first position to the second position, and remaining at the second position,
wherein the elastic assembly comprises a first torsion spring; and
wherein the buckle assembly comprises:
a mounting plate, wherein the mounting plate is rotatably connected to the base through the first torsion spring, the mounting plate comprises a pressing part, and the pressing part is movably connected to the mounting plate; and
a buckle, wherein the buckle is connected to the mounting plate, and the buckle is rotatably connected to the base;
a mounting groove is provided on the base, the mounting groove is located at a position of the base corresponding to the pressing part, and when the buckle assembly is located at the first position, the pressing part is engaged in the mounting groove, and the mounting plate blocks the fastener; and
in response to a pressing operation acting on the pressing part, the first torsion spring drives the mounting plate to rotate from the first position to the second position, and remains at the second position.

2. The hanging lug according to claim 1, wherein the elastic assembly further comprises a first spring; and the pressing part is movably connected to the base through the first spring, in response to the pressing operation acting on the pressing part, the pressing part slides out from the mounting groove, and under an action of the first torsion spring, the mounting plate rotates from the first position to the second position, and remains at the second position.

3. The hanging lug according to claim 1, wherein the buckle assembly further comprises: a connecting rod, wherein one end of the connecting rod is connected to the mounting plate, and an other end of the connecting rod is connected to the buckle; and rotation of the mounting plate drives the connecting rod to rotate, and rotation of the connecting rod drives the buckle to rotate.

4. The hanging lug according to claim 3, wherein one end of the connecting rod is rotatably connected to the mounting plate, a sliding groove is provided on an other end of the connecting rod, at least a part of the buckle is engaged in the sliding groove, and the at least a part of the buckle is slidable along the sliding groove.

5. The hanging lug according to claim 4, wherein the connecting rod comprises:
a first connecting rod segment, wherein one end of the first connecting rod segment is rotatably connected to the mounting plate; and
a second connecting rod segment, wherein one end of the second connecting rod segment is connected to an other end of the first connecting rod segment, the second connecting rod segment is perpendicular to the first connecting rod segment, and the sliding groove is formed on the second connecting rod segment.

6. The hanging lug according to claim 4, wherein the buckle comprises:
a buckle body, wherein the buckle body is rotatably connected to the base;

a buckle part, wherein the buckle part is connected to one side of the buckle body away from the mounting plate; and a matching part, wherein the matching part is connected to the buckle body, a matching column is arranged on the matching part, and the matching column is slidably engaged in the sliding groove.

7. The hanging lug according to claim 1, wherein the elastic assembly further comprises: a second torsion spring, wherein the buckle is rotatably connected to the base through the second torsion spring; and in response to the pressing operation acting on the pressing part, the second torsion spring drives the buckle to rotate around the base, to drive the mounting plate to rotate from the first position to the second position, and remains at the second position.

8. The hanging lug according to claim 7, wherein an elastic force of the first torsion spring is greater than an elastic force of the second torsion spring.

9. The hanging lug according to claim 7, further comprising:
   a first rotating shaft, the first rotating shaft being arranged on the base, both the mounting plate and the first torsion spring being sleeved outside the first rotating shaft, both the mounting plate and the first torsion spring being rotatable around the first rotating shaft, and the first torsion spring being located between the mounting plate and the first rotating shaft; and
   a second rotating shaft, the second rotating shaft being arranged on the base, both the buckle and the second torsion spring being sleeved outside the second rotating shaft, both the buckle and the second torsion spring being rotatable around the second rotating shaft, and the second torsion spring being located between the buckle and the second rotating shaft.

10. The hanging lug according to claim 1, wherein when the buckle assembly is at the second position, a planar direction of the mounting plate is arranged inclined to a vertical direction.

11. The hanging lug according to claim 10, wherein an angle between the planar direction and the vertical direction of the mounting plate is any value between about 0° and about 180°.

12. The hanging lug according to claim 1, wherein the mounting plate further comprises: a first mounting part, wherein the first mounting part is connected to the base; and a second mounting part, wherein the second mounting part is detachably connected to the first mounting part, the second mounting part is connected to the buckle, and the pressing part is movably connected to the second mounting part.

13. The hanging lug according to claim 12, wherein the first mounting part and the second mounting part are sequentially arranged in a direction toward the buckle,
   a matching groove is formed on the second mounting part, the matching groove runs through the second mounting part in a thickness direction of the second mounting part, the matching groove runs through an end surface of one end of the second mounting part away from the first torsion spring, and the pressing part is slidably engaged in the matching groove.

14. The hanging lug according to claim 12, wherein at least one first engagement member is arranged on the first mounting part, at least one second engagement member is arranged on the second mounting part, and the second engagement member is engaged with the first engagement member to implement detachable connection between the second mounting part and the first mounting part.

15. A server, comprising:
   a case; and
   a hanging lug, the hanging lug being the hanging lug according to claim 1, and the hanging lug being connected to the case.

16. The server according to claim 15, wherein the hanging lug comprises a functional module; and
   the server further comprising:
   a baffle, the baffle being connected to the hanging lug and the case respectively, the baffle, the hanging lug, and the case jointly defining an accommodating cavity, and the accommodating cavity being configured to accommodate wiring of the functional module.

17. The server according to claim 16, wherein the functional module comprises at least one of a USB module and a display graphics array module.

18. The server according to claim 16, wherein the baffle is detachably connected to the hanging lug and the case respectively.

19. A server system, comprising:
   a server cabinet; and
   a server, the server being the server according to claim 15, and the server being detachably connected to the server cabinet through the hanging lug of the server.

* * * * *